United States Patent [19]
Fuentes

[11] Patent Number: 5,409,684
[45] Date of Patent: Apr. 25, 1995

[54] PROCESS AND INSTALLATION FOR THE COMBINED PRODUCTION OF SYNTHETIC AMMONIA AND PURE HYDROGEN

[75] Inventor: Francois Fuentes, Paris, France

[73] Assignee: L'Air Liquide, Societe Anonyme Pour L'Etude et L'Exploitation des Procedes Georges Claude, Paris, France

[21] Appl. No.: 72,989

[22] Filed: Jun. 7, 1993

[30] Foreign Application Priority Data

Jun. 10, 1992 [FR] France ................... 92 06956

[51] Int. Cl.$^6$ ............... C01C 1/00; C01C 1/04
[52] U.S. Cl. ................. 423/359; 422/148; 422/170; 423/650
[58] Field of Search ........... 423/359, 650; 422/129, 422/141, 168, 148, 170, 169

[56] References Cited

U.S. PATENT DOCUMENTS

| | | | |
|---|---|---|---|
| 4,172,885 | 10/1979 | Perry | 423/359 |
| 4,180,552 | 12/1979 | Graham et al. | 423/359 |
| 4,180,553 | 12/1979 | Null et al. | 423/359 |
| 4,479,925 | 10/1984 | Shires et al. | 423/359 |
| 4,553,981 | 11/1985 | Fuderer | 423/359 |

FOREIGN PATENT DOCUMENTS

| | | |
|---|---|---|
| 0092969 | 11/1983 | European Pat. Off. |
| 0241313 | 10/1987 | European Pat. Off. |
| 0266745 | 5/1988 | European Pat. Off. |

OTHER PUBLICATIONS

P. J. Van Den Berg et al., "Introduction to Chemical Process Technology", 1983, pp. 28–30, Delft University Press, Delft, Holland.

*Primary Examiner*—Wayne Langel
*Attorney, Agent, or Firm*—Young & Thompson

[57] ABSTRACT

Process and apparatus for the combined production of ammonia synthesis gas and pure hydrogen. There is withdrawn (at 21) a flow of synthesis gas which is first treated in a permeation unit (24) with the return (at 28) of the non-permeated gas, while the permeate (32) is treated by adsorption (34) (35) (36), which permits producing (in 57) very pure hydrogen. The process has a high energy efficiency.

9 Claims, 1 Drawing Sheet

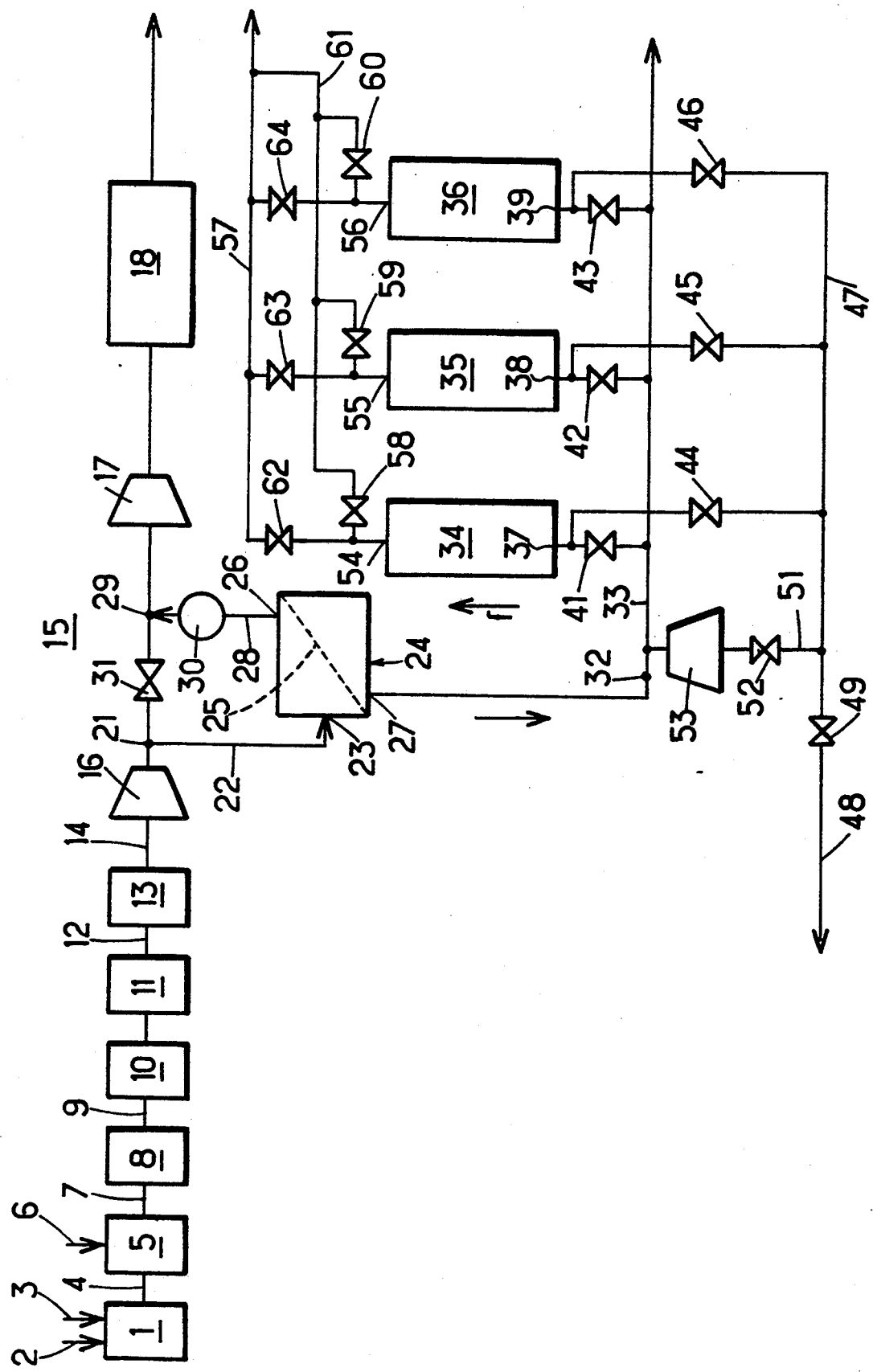

PROCESS AND INSTALLATION FOR THE COMBINED PRODUCTION OF SYNTHETIC AMMONIA AND PURE HYDROGEN

FIELD OF THE INVENTION

The present invention relates to the combined production of synthetic ammonia and pure hydrogen, from a hydrocarbon base gas, particularly methane. To this end, the sequence of the following operations is followed:

a) a reforming in at least two steps, of which a last step is with introduction of air, elaborating from said hydrocarbon base gas and reforming air, a composite gaseous mixture incorporating essentially nitrogen and hydrogen, with small proportions of carbon dioxide, water vapor and carbon monoxide, and traces of argon and methane;

b) substantial elimination of the carbon monoxide by conversion to carbon dioxide, leaving only traces of carbon monoxide;

c) a process for the elimination of carbon dioxide, leaving only traces of carbon dioxide;

d) substantial methanization of the carbon monoxide reducing to a very low level the traces of carbon monoxide, and producing methane;

e) if desired drying to eliminate water vapor;

all so as to produce a gas for the synthesis of ammonia ($NH_3$) constituted of hydrogen ($H_2$) (content of the order of 74–75), nitrogen ($N_2$) (content of the order of 24–25%), argon (Ar) and methane ($CH_4$) (combined content of the order of 1%).

BACKGROUND OF THE INVENTION

There has sometimes been used an installation for the production of ammonia, which treats extremely high flow rates of synthesis gas, to withdraw a moderate flow rate of synthesis gas so as to elaborate hydrogen and, for this purpose, while compressing in several compression stages the synthesis gas to send it to an ammonia synthesis reactor to produce the flow of synthetic ammonia, there is withdrawn, between two compression stages, a relatively low flow rate of withdrawn synthesis gas under medium pressure, the hydrogen is substantially separated from the other constituents: nitrogen, argon, methane, to produce a flow of hydrogen as pure as possible, said separation taking place generally by permeation delivering substantially under said medium pressure a stream consisting essentially of hydrogen and nitrogen with substantially all the argon and all the methane, which stream is returned to the ammonia synthesis gas under medium pressure and a permeation gas under lower pressure consisting essentially of hydrogen with a small content of nitrogen and traces of argon, methane and as the case may be water vapor. There has also been proposed effecting said separation by adsorption on a molecular sieve according to the process with cyclic pressure variation, called "pressure swing adsorption" or PSA, delivering on the one hand, under medium pressure, a production gas consisting essentially of hydrogen with traces of argon and traces of nitrogen, methane and as the case may be water vapor, on the other hand, under a lower pressure, a residual gas with higher content of hydrogen, a substantial content of nitrogen, and low contents of argon, methane and as the case may be water vapor.

With these processes, one is confronted either with poor quality hydrogen product, or poor energy use, because the nitrogen, which is found in the residual low pressure gas, must be recompressed at the withdrawal pressure of the synthesis gas. On the other hand, and this is particularly true in the adsorption process, this process leads to poor performance of the hydrogen production installation because of recycling of substantial quantities of argon which is hardly adsorbable.

SUMMARY OF THE INVENTION

The present invention has for its object a process for the production of high purity nitrogen from an ammonia synthesis gas, while limiting the quantities of nitrogen and hydrogen at low pressure, and which must be either recompressed or purged to the exterior, and these objects are achieved according to the invention in that the production stage of pure hydrogen comprises at least two substeps of purification, namely:

an initial substep of permeation delivering under substantially said medium pressure an effluent consisting essentially of hydrogen and nitrogen with substantially all the argon and all the methane, which effluent is sent to the ammonia synthesis gas; and a permeation gas under lower pressure consisting essentially of hydrogen with a low content of nitrogen and traces of argon, methane and as the case may be water vapor;

a final substep for adsorption of the permeation gas by adsorption on molecular sieves, according to the cyclic pressure variation process called "pressure swing adsorption" or PSA delivering, on the one hand under said lower pressure, a production gas consisting essentially of hydrogen with traces of argon of the order of or less than 100 ppm, and traces of nitrogen, of methane, and as the case may be of water vapor, each with a content of the order of, or less than, 1 ppm, on the other hand, under an even lower pressure, a residual gas with elevated content of hydrogen, a substantial content of nitrogen, and low contents of argon, methane and as the case may be water vapor.

In this way, by preliminary separation by permeation, there is produced at a pressure near the withdrawal pressure a gaseous mixture with a high content of hydrogen and nitrogen, which is easily sent to the synthesis gas, with minimum energy consumption.

This subsequent adsorption unit then need only treat a gaseous mixture with very high hydrogen content and containing only a small amount of nitrogen, which facilitates the operation. Moreover, the residual gas from the adsorption, which is again rich in hydrogen, can be recycled to the permeation gas, before treatment by adsorption.

The invention also relates to an installation for the combined production of synthetic ammonia and pure hydrogen, practicing the above process.

BRIEF DESCRIPTION OF THE DRAWING

The characteristics and advantages of the invention will become apparent from the description which follows, by way of example, with reference to the accompanying drawing, which is a diagram of an installation.

DETAILED DESCRIPTION OF THE INVENTION

According to the drawing, an installation comprises a primary reforming unit 1, supplied at 2 with natural gas (essentially methane) and at 3 with water vapor, producing a gaseous mixture ($H_2$, $CH_4$, CO, $CO_2$, $H_2O$) which is then sent via conduit 4 to a secondary reforming unit 5 into which is admitted air at 6, and from which leaves at 7 a gaseous mixture ($N_2$, $H_2$, CO, $CO_2$, $H_2O$) with traces of methane $CH_4$ and argon Ar, which is then treated by washing at 8, eliminating essentially the CO, such that the gaseous mixture at 9 will comprise, in addition to $N_2$ and $H_2$, only low proportions of $CO_2$ and $H_2O$ and traces of $CH_4$, Ar and CO. In 10 the substantial elimination of $CO_2$ is effected, such that the mixture then comprises only, in addition to $N_2$, $H_2$, $H_2O$, traces of $CH_4$, Ar, CO and $CO_2$. In 11, the methanization of CO takes place, such that at 12 will remain only small traces of CO, $CO_2$, Ar and $CH_4$ (Ar+$CH_4$ of the order of 1%). There is obtained a synthesis gas with $H_2$ of the order of 74%, $N_2$ of the order of 25%, Ar+$CH_4$+$H_2O$ of the order of 1%. To improve the $H_2$:$N_2$ ratio, adjusting means can be included for the reforming operation, as described hereinafter. If desired, water vapor may be eliminated by drying at 13.

This mixture 14 is sent at 15 to a compressor with several stages 16 and 17, then to the synthesis reactor 18 producing a flow of ammonia $NH_3$.

Between the two compression stages 16 and 17, at an upstream point 21, there is withdrawn a moderate flow of synthesis mixture, which is conducted via 22 to an inlet 23 of a permeation unit 24 with a membrane 25, having an outlet 26 for the gas that did not permeate, therefore practically at the same medium pressure as at the inlet 23, and an outlet 27 for permeation gas under lower pressure. The unpermeated gas emerging at 26 is sent via 28 to a recycling point 29, situated downstream of the withdrawal point 21. There is provided either a compressor 30 in the conduit 28, or a pressure reducing device 31 between the withdrawal point 21 and the recycling point 29, so as to ensure the gaseous flow through the permeation unit 24.

The permeation gas emerging at 27 is sent via 32 to a supply conduit 33 under pressure (in fact the "low" pressure of the permeation gas of the permeation unit 24) of an adsorption unit with several adsorbers (three adsorbers are shown here by way of example at 34, 35, 36) each having an "inlet" 37, 38, 39 connected on the one hand by valves 41, 42, 43 to the supply conduit 33, on the other hand, by valves 44, 45, 46 to a residual gas conduit 47, itself connected, on the one hand, to a purge conduit 48 by a valve 49, and on the other hand to a recycling conduit 51 by a valve 52 and a compressor 53.

A downstream "outlet" 54, 55, 56 (in the co-current direction f) opens on the one hand, via valves 62, 63, 64 into a production conduit 57, on the other hand via valves 58, 59, 60 into a conduit for gas elution and final repressurization 61, connected to the production conduit 57.

The described installation therefore treats first of all a portion of the gaseous synthesis mixture conducted via 22 into the permeation unit permitting returning via 28 a gas of high content of $N_2$ and $H_2$ substantially under the medium withdrawal pressure. The permeation gas under low pressure in 33 has a very high content, of the order of 95%, of $H_2$, the rest being substantially nitrogen (1 to 2%) and traces of argon, methane and water vapor. At the inlet (37, 38, 39) of the adsorption unit (34, 35, 36) operating in cyclic fashion, one of the adsorbers (34) is in isobaric production in the circulation direction f (called co-current), the second (35) is first in depressurization (in co-current equilibrium via 59, 60 then in countercurrent for purge via 45, 47, 49, 48), then in countercurrent elution (via 59, 45) and recycling via 51, 52, 53, while the third adsorber 36 is in the course of repressurization (pressure balancing with 35, via 59 and 60, then finally with the production gas via 60). It should be noted that there has been described a simplified circuit and that there could be used a cycle substantially more elaborate with a greater number of adsorbers, which permit delivering (at 57) a very pure hydrogen production gas (of 99.99%) with traces of nitrogen ($N_2$) less than 1 ppm, argon (Ar) less than 100 ppm, methane ($CH_4$) less than 1 ppm and water vapor ($H_2O$) less than 1 ppm. The gas purged at 48 has high contents of $H_2$ and $N_2$ and low contents of Ar, $CH_4$, $H_2O$. What is recycled at 51, 52, 53, and which arises from the elution of an adsorber under low pressure, has generally a higher content of hydrogen.

By way of example, there are to be noted hereafter the results obtained according to the process of the invention, with a process that does not differentiate the residual gases of final decompression and elution.

Preferably, the adjustment parameters of the reforming operation are modified so as to increase the ratio $H_2$:$N_2$ at the inlet of the compression stages 14, so as to reach the optimum ratio in the synthesis reactor. In a preferred manner, the ratio $H_2$:$N_2$ at the inlet of the compression stages 14 is greater than 3:1.

|  | Gas to be treated (via 22) | Return (via 28) | Permeation (via 32) | PSA Inlet (via 33) | Product $H_2$ (via 57) | Recycling (via 51) | Purge (via 48) |
| --- | --- | --- | --- | --- | --- | --- | --- |
| Pressure (bar abs) | 75 | 74 | 28 | 28 | 27 | 1.5 | 1.5 |
| Composition vol. | | | | | | | |
| $H_2$ | 73.4% | 42.4% | 98.4% | 94.6% | 99.99% | 78.7% | 78.7% |
| $N_2$ | 25.0% | 54.3% | 1.4% | 4.8% | <1 ppm | 18.8% | 18.8% |
| Ar | 0.4% | 0.8% | 0.1% | 0.1% | <100 pp | 0.4% | 0.4% |
| $CH_4$ | 1.1% | 2.4% | <500 ppm | 0.1% | <1 ppm | 0.5% | 0.5% |
| $H_2O$ | 0.1% | 0.1% | 0.1% | 0.4% | <1 ppm | 1.5% | 1.5% |
| Flow rate $Nm^3/h$ | 18000 | 8056 | 9944 | 12310 | 9200 | 2366 | 744 |

What is claimed is:

1. Process for the combined production of synthetic ammonia ($NH_3$) and pure hydrogen ($H_2$), from a hydrocarbon base gas which comprises the following steps:
   a) reforming said hydrocarbon base gas in at least two stages, of which a last stage is with introduction of air, producing from said hydrocarbon base gas and reforming air, a gaseous composite mixture consisting essentially of nitrogen ($N_2$) and hydrogen ($H_2$) with small proportions of carbon dioxide ($CO_2$), water vapor ($H_2O$), carbon monoxide (CO), argon (Ar) and methane ($CH_4$);

b) washing said gaseous composite mixture so as to eliminate substantially all carbon monoxide by transformation into carbon dioxide, thereby leaving only traces of carbon monoxide, carbon dioxide and methane in the washed gaseous mixture;

c) eliminating carbon dioxide from the washed gaseous mixture, thereby leaving only traces of carbon dioxide in the resultant mixture;

d) subjecting the resultant mixture to methanization of the carbon monoxide, thereby reducing still further the content of the traces of carbon monoxide, and producing traces of methane, to obtain an ammonia synthesis gas comprising about 74–75 volume percent of hydrogen, about 24–25 volume percent of nitrogen, and about 1 volume percent of combined argon and methane;

thereafter:

e) compressing in several compression stages the synthesis gas and sending it to an ammonia synthesis reactor for producing a flow of synthetic ammonia;

f) removing between two of said compression stages a flow of synthesis gas under medium pressure, whereby substantially all the hydrogen is separated from the other constituents: nitrogen, argon, methane, to produce a gaseous flow having a relatively high hydrogen content, wherein step f) for production of hydrogen comprises at least two purification substeps, namely:

$f_1$) an initial substep of permeation delivering under said medium pressure an effluent consisting essentially of hydrogen and nitrogen with substantially all the argon and all the methane, which effluent is recycled to the ammonia synthesis gas; and a permeation gas under lower pressure consisting essentially of hydrogen with a residual content of nitrogen and traces of argon and methane;

$f_2$) an initial adsorption substep of the permeation gas on molecular sieves of a pressure swing adsorption system delivering under said lower pressure a production gas constituted by hydrogen with only traces of argon in an amount equal to or less than 100 ppm and traces of nitrogen, methane and water vapor, each in an amount equal to or less than 1 ppm, and under an even lower pressure, a residual gas containing a considerable amount of hydrogen, a significant amount of nitrogen, and small amounts of argon, methane and water vapor.

2. Process for the combined production of synthetic ammonia and pure hydrogen, according to claim 1, further comprising returning a portion of the residual gas after recompression to the permeation gas.

3. Process for the combined production of synthetic ammonia and pure hydrogen, according to claim 2, further including a regeneration step of said molecular sieves with depressurization comprising a terminal phase in countercurrent relative to a co-current adsorption direction followed by a final regeneration phase with countercurrent elution with a gas having a substantial hydrogen content, wherein the portion of the residual gas returned to the permeation gas is exclusively the gas issuing from the elution, and wherein a purge of the final depressurization gas is conducted countercurrently.

4. Process for the combined production of synthetic ammonia and pure hydrogen, according to claim 1, wherein the reforming step is controlled so as to increase the $H_2:N_2$ ratio at the inlet of the compression stages so as to achieve an optimum $H_2:N_2$ ratio in the synthesis reactor.

5. Process for the combined production of synthetic ammonia and pure hydrogen, according to claim 4, wherein the $H_2:N_2$ ratio at the inlet of the compression stages is greater than 3:1.

6. Installation for the combined production of synthetic ammonia and pure hydrogen, comprising:

a) a reforming unit for performing at least two reforming stages, of which a last stage includes means for introducing air, said reforming unit further including means for producing from hydrocarbon base gases and reforming air, a composite gaseous mixture consisting essentially of nitrogen and hydrogen, with small proportions of carbon dioxide, water vapor and carbon monoxide, argon and methane;

b) a unit for substantial elimination of carbon monoxide by transformation into carbon dioxide leaving only traces of carbon monoxide, carbon dioxide and methane;

c) a unit for the elimination of carbon dioxide, leaving only traces of carbon dioxide;

d) a methanization unit of the carbon monoxide for reducing the content of the traces of carbon monoxide, and for producing methane;

e) compression means in several compression stages including a conduit for sending synthesis gas to a reactor for ammonia synthesis to produce the flow of synthetic ammonia;

f) a gaseous separation unit operating on a stream withdrawn between two stages of the compression means for separating hydrogen from other gaseous constituents comprising nitrogen, argon and methane;

wherein the gaseous separation unit comprises $f_1$) a gaseous permeation unit including a compartment under pressure having an inlet connected to the synthesis gas conduit downstream of a stage of said compression means, an outlet connected to said synthesis gas conduit, downstream of the connection point of said inlet, said outlet including means for circulating gas, and a permeation compartment under lower pressure, with an outlet for permeate;

$f_2$) an adsorption unit with molecular sieves, each connected successively:

by an inlet in co-current with a supply conduit for transmitting a gaseous mixture comprising the permeate of the permeation unit;

by a countercurrent outlet fluidly connected to a residual gas conduit.

7. Installation for the combined production of synthetic ammonia and pure hydrogen, according to claim 6, further comprising a recycling conduit between the residual gas conduit and the supply conduit of the adsorption unit, said recycling conduit including a recycling compressor.

8. Installation for the combined production of synthetic ammonia and pure hydrogen, according to claim 6, further comprising means for adjusting the reforming operation by increasing the $H_2:N_a$ ratio at the inlet of the compression stages so as to achieve an optimum ratio in the synthesis reactor.

9. Installation for the combined production of synthetic ammonia and pure hydrogen, according to claim 8, wherein the adjustment means permit increasing the $H_2:N_2$ ratio above 3:1.

* * * * *